United States Patent
Katter, Jr.

(10) Patent No.: US 10,134,204 B2
(45) Date of Patent: Nov. 20, 2018

(54) METHOD AND SYSTEM FOR COLLECTING MACHINE OPERATION DATA USING A MOBILE DEVICE

(71) Applicant: Caterpillar Inc., Peoria, IL (US)

(72) Inventor: James G. Katter, Jr., Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 22 days.

(21) Appl. No.: 15/162,660

(22) Filed: May 24, 2016

(65) Prior Publication Data

US 2017/0084089 A1 Mar. 23, 2017

Related U.S. Application Data

(60) Provisional application No. 62/222,752, filed on Sep. 23, 2015.

(51) Int. Cl.
| | |
|---|---|
| *G07C 5/00* | (2006.01) |
| *G06Q 50/02* | (2012.01) |
| *B60P 1/04* | (2006.01) |
| *G01P 15/02* | (2013.01) |
| *G07C 5/02* | (2006.01) |
| *G06Q 50/08* | (2012.01) |
| *G06Q 10/08* | (2012.01) |
| *G01C 19/02* | (2006.01) |
| *G01C 15/02* | (2006.01) |

(52) U.S. Cl.
CPC ............. *G07C 5/008* (2013.01); *B60P 1/04* (2013.01); *G01C 15/02* (2013.01); *G01C 19/02* (2013.01); *G01P 15/02* (2013.01); *G06Q 10/08* (2013.01); *G06Q 50/02* (2013.01); *G06Q 50/08* (2013.01); *G07C 5/02* (2013.01); *G07C 2205/02* (2013.01)

(58) Field of Classification Search
CPC ...... G07C 5/008; G07C 5/02; G07C 2205/02; G01C 19/02; G01C 15/02; G06Q 10/08; G06Q 50/08; G06Q 50/02; B60P 1/04; G01P 15/02
See application file for complete search history.

(56) References Cited

U.S. PATENT DOCUMENTS 5,956,250 A * 9/1999 Gudat ............... B60K 31/0008
                                                    318/587
6,892,131 B2 5/2005 Coffee et al.
(Continued)

*Primary Examiner* — Redhwan K Mawari
*Assistant Examiner* — Edward Torchinsky
(74) *Attorney, Agent, or Firm* — Harrity & Harrity LLP

(57) ABSTRACT

A method for collecting machine operation data of a machine is disclosed. Initially, first and second sensor data is determined by a mobile sensor of a mobile device processor located on or within a machine. A first dynamic characteristic is determined based on at least one of the first and second sensor data. Next, the mobile device connects wirelessly to an external computing platform and the first dynamic characteristic is transmitted from the mobile device to the external computing platform. Third and fourth sensor data are determined by the mobile sensor. A second dynamic characteristic is determined based on at least one of the third and fourth sensor data. The second dynamic characteristic is transmitted to the external computing platform. A first dynamic change is determined based on the first and second dynamic characteristics. A first operation performed by the machine is determined based on the first dynamic change.

20 Claims, 3 Drawing Sheets

(56) References Cited

U.S. PATENT DOCUMENTS

| | | | |
|---|---|---|---|
| 7,894,961 B2 * | 2/2011 | Blackburn | G07C 5/085 |
| | | | 180/271 |
| 7,911,379 B2 | 3/2011 | Cameron | |
| 8,014,974 B2 | 9/2011 | Doddek et al. | |
| 8,514,058 B2 * | 8/2013 | Cameron | B66C 13/16 |
| | | | 340/10.1 |
| 8,571,762 B2 * | 10/2013 | McAree | E02F 3/304 |
| | | | 342/357.28 |
| 8,833,861 B2 * | 9/2014 | Donnelli | B60P 1/045 |
| | | | 298/17 S |
| 2002/0077750 A1 | 6/2002 | McDonald, Jr. et al. | |
| 2007/0150149 A1 * | 6/2007 | Peterson | E02F 3/437 |
| | | | 701/50 |
| 2008/0319666 A1 | 12/2008 | Petrov et al. | |
| 2010/0057511 A1 | 3/2010 | Mansouri et al. | |
| 2010/0188503 A1 * | 7/2010 | Tsai | G01C 21/20 |
| | | | 348/142 |
| 2012/0053805 A1 * | 3/2012 | Dantu | B60W 40/09 |
| | | | 701/70 |
| 2012/0232961 A1 | 9/2012 | Wellman et al. | |
| 2012/0256763 A1 * | 10/2012 | Johnson | G08C 17/02 |
| | | | 340/870.07 |
| 2013/0157647 A1 * | 6/2013 | Kolodziej | H04M 1/72522 |
| | | | 455/419 |
| 2014/0025440 A1 | 1/2014 | Nagda et al. | |
| 2015/0088708 A1 * | 3/2015 | Fain | G06Q 10/08 |
| | | | 705/32 |
| 2015/0134184 A1 * | 5/2015 | Takeda | G05D 1/0278 |
| | | | 701/24 |
| 2015/0204758 A1 | 7/2015 | Schnell et al. | |
| 2017/0169626 A1 * | 6/2017 | Thomsen | G07C 5/02 |

\* cited by examiner

METHOD AND SYSTEM FOR COLLECTING MACHINE OPERATION DATA USING A MOBILE DEVICE

CROSS REFERENCE TO RELATED APPLICATIONS

This application claims the benefit of U.S. Provisional Patent Application No. 62/222,752 entitled "Method and System for Collecting Machine Operation Data Using a Mobile Device," which was filed on Sep. 23, 2015.

TECHNICAL FIELD

This patent disclosure relates generally to a system and method for collecting machine operation data for a machine, and more particularly, to a system and method for collecting machine operation data of a machine using a mobile device.

BACKGROUND

Operators of machine fleets need to know where each machine in the fleet is located and what it is doing in order to make decisions on how to use the machines most efficiently. In recent years, the fleet management systems that have developed rely on on-board telemetric systems to allow each machine to communicate with the external computing platform. These fleet management systems allow an operator to locate and determine what each machine is doing in real-time. Further, the fleet management systems provide an operator with an ability to receive information from the external computing platform for improved fleet management.

Typically, these fleet management systems require a common software and/or hardware interface with a machine in order for the external computing platform to communicate with the machine. Unfortunately, many legacy machines and third party machines do not have the requisite software and/or hardware and may not be able to communicate with the fleet management system. As such, operators may not have basic machine operation data for all of the machines in their fleet.

U.S. Pat. No. 6,892,131 (the '131 patent), entitled "Vehicle Tracking, Communication and Fleet Management System," discloses a system and method for tracking machines in a fleet. The system described in the '131 patent includes GPS receivers in the machines in order to relay location information back to a central management office. However, the system described in the '379 patent relies on hardware and/or software of the machine in order to communicate with the central management office. Machines from third party vendors may not be able to communicate properly with the central management office. Accordingly, there is a need for improved system and methods to address the aforementioned problems and/or other problems known in the art.

It will be appreciated that this background description has been created to aid the reader, and is not to be taken as a concession that any of the indicated problems were themselves known in the art.

SUMMARY

According to an aspect of the disclosure, a method for collecting machine operation data of a machine is disclosed. The method comprises determining, by a mobile sensor of a mobile device processor located on or within a machine, a first sensor data and a second sensor data, determining, based on at least one of the first sensor data and the second sensor data, a first dynamic characteristic of the machine, connecting wirelessly the mobile device to an external computing platform, transmitting the first dynamic characteristic from the mobile device to the external computing platform, determining, by the mobile sensor of the mobile device processor located on or within the machine, a third sensor data and a fourth sensor data, determining, based on at least one of the third sensor data and the fourth sensor data, a second dynamic characteristic of the machine, transmitting the second dynamic characteristic to the external computing platform from the mobile device to the external computing platform, determining, based on the first dynamic characteristic and the second dynamic characteristic, a first dynamic change of the machine, and determining, based on the first dynamic change, a first operation performed by the machine.

According to another aspect of the disclosure, a method for collecting machine operation data of a machine is disclosed. The method comprises connecting wirelessly a mobile device to an external computing platform, the mobile device being located on or within the machine, receiving a first dynamic characteristic of the machine from the mobile device, the first dynamic characteristic determined based on at least one of a first sensor data and a second sensor data from a mobile sensor of the mobile device, receiving a second dynamic characteristic of the machine from the mobile device, the second dynamic characteristic determined based on at least one of a third sensor data and a fourth sensor data from the mobile sensor of the mobile device, determining, based on the first dynamic characteristic and the second dynamic characteristic, a first dynamic change of the machine, and determining, based on the first dynamic change, a first operation performed by the machine.

According to yet another aspect of the disclosure, an article of manufacture comprising non-transitory machine-readable media has instructions encoded thereon for causing a processor to determine, by a mobile sensor of a mobile device processor located on or within a machine, a first sensor data and a second sensor data, determine, based on at least one of the first sensor data and the second sensor data, a first dynamic characteristic of the machine, connect wirelessly, by the mobile device, the mobile device to an external computing platform, transmit the first dynamic characteristic from the mobile device to the external computing platform, determine, by the mobile sensor of the mobile device processor located on or within the machine, a third sensor data and a fourth sensor data, determine, based on at least one of the third sensor data and the fourth sensor data, a second dynamic characteristic of the machine, transmit the second dynamic characteristic to the external computing platform from the mobile device to the external computing platform, determine, based on the first dynamic characteristic and the second dynamic characteristic, a first dynamic change of the machine, and determine, based on the first dynamic change, a first operation performed by the machine.

DETAILED DESCRIPTION

Aspects of the disclosure will now be described in detail with reference to the drawings, wherein like reference numbers refer to like elements throughout, unless specified otherwise.

Figure 1:
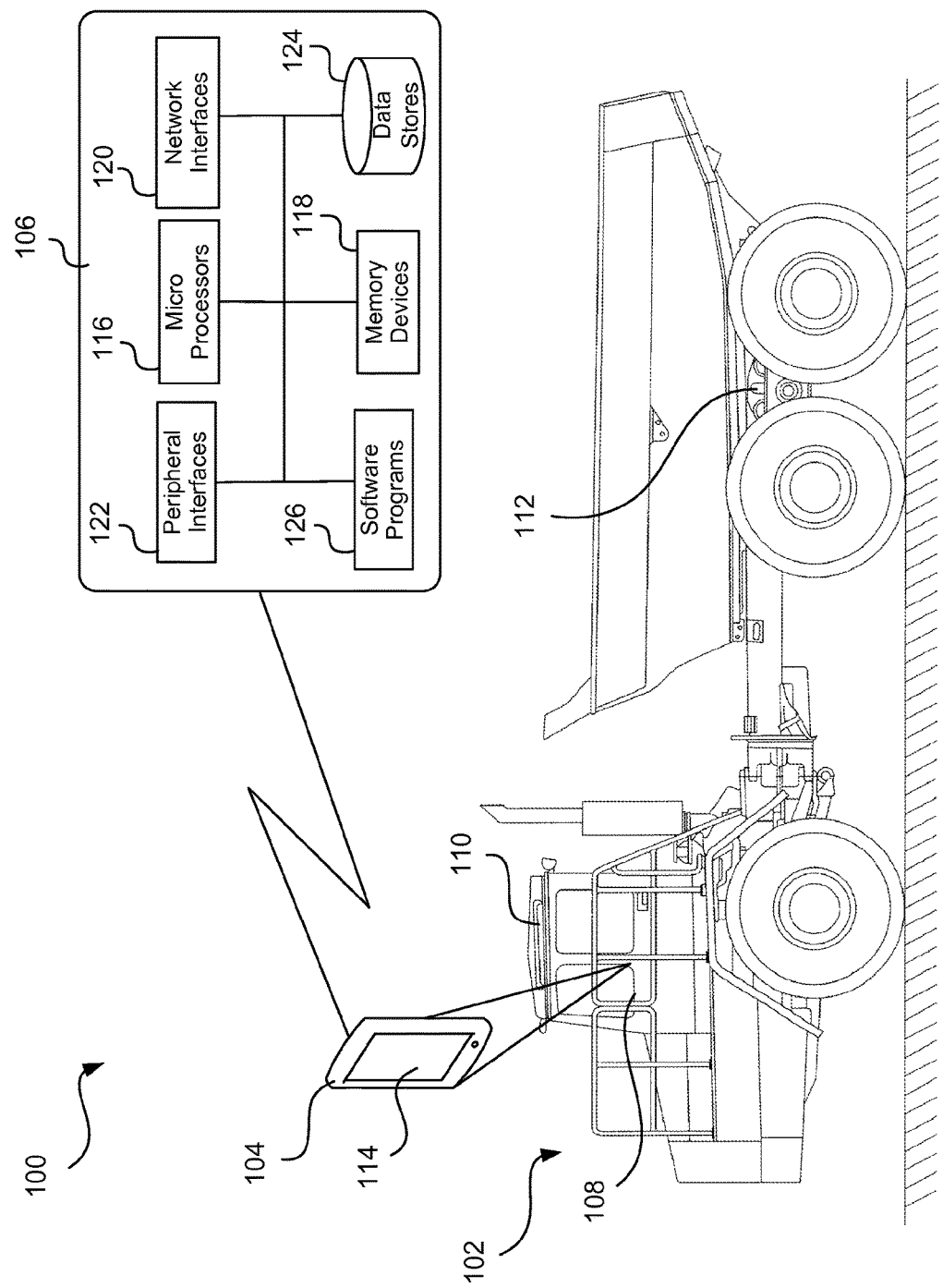
FIG. 1 illustrates a system for collecting machine operation data according to an aspect of the disclosure.

FIG. 1 illustrates a system 100 for collecting machine operation data according to an aspect of the disclosure. The system 100 includes at least one machine 102, at least one mobile device 104, and an external computing platform 106. The system 100 may include additional components not explicitly shown, such as a base station with which the mobile device 104 may communicate, a satellite positioning system, a customer or a third party computing infrastructure, additional machines 102 and mobile devices 104, human and/or robotic operators for the machine 102 and/or the mobile device 104, and the like. The machine 102 and/or mobile device may be deployed in a worksite that is operated upon by the machine 102 to alter physical characteristics of the worksite. Although only a single machine 102 and mobile device 104 are shown in FIG. 1, the system 100 preferably includes a plurality of machines 102 and mobile devices 104.

By way of example only and not by way of limitation, the machine 102 may be an off-highway truck, a motor grader, a track type tractor, a dozer, a scraper, a backhoe loader, a paver, a crane, or other types of machines or vehicles associated with an industry such as mining, construction, farming, transportation, or any other industry known in the art handler, or the like. The specific machine 102 illustrated in FIG. 1 is a haul truck. It will be appreciated that a physical placement of the various devices and components of the machine 102 are for discussion purposes only and the actual placement of these components and devices on the machine 102 will vary depending upon a physical design, type, or structure of the machine 102, as will be understood by one of ordinary skill in the art in view of this disclosure.

The machine 102 may include a controller 108, and an operator cab 110 that includes one or more control input devices that are operatively coupled to the controller 108. The control input devices may include manual control input devices configured to communicate manual control inputs form an operator in the cab 110 to the controller 108; automatic control input devices such as open-loop controllers, closed-loop controllers, programmable logic controllers, and the like; remote control input devices such as wired or wireless telemetry devices; combinations thereof; or any other control input device known in the art.

The machine 102 may also include at least one machine sensor 112 in electronic communication with the controller 108. By way of example only, the at least one machine sensor 112 may be an engine speed sensor configured to determine a speed of an engine of the machine 102, a machine speed sensor configured to determine a ground speed of the machine 102, a temperature sensor configured to determine a temperature of at least one component of the machine 102, an electrical sensor configured to determine at least one electrical parameter associated with at least one component of the machine 102, a payload sensor configured to determine at least one payload value of the machine 102, or any other sensor known in the art configured to determine a machine parameter of the machine 102. In the aspect illustrated by FIG. 1, the machine sensor 112 is a payload sensor.

Further, by way of example only, the mobile device 104 may be a handheld mobile phone, a "smart" phone, a portable tablet computing device, a laptop computer, and the like, configured to implement various features and functionalities of the various aspects of the disclosure. The mobile device 104 may be located on or within the machine 102. For example, the mobile device 104 may be located in the cab 110, such as on an operator located within the cab 110 or placed in a stationary location in the cab 110. The mobile device 104 includes a mobile sensor 114. The mobile sensor 114 may be at least one of an accelerometer, a barometer, a thermometer, a gyroscopic sensor, a magnetometer, a Global Positioning System (GPS) receiver, an Assisted GPS (A-GPS) transceiver, a Global Navigation Satellite System (GNSS) receiver, a WiFi based positioning system, any other sensor that may be implemented on or into the mobile device 104, or a combination of the above.

The mobile sensor 114 is configured to provide electrical signals to a processor of the mobile device 104 related to various operating parameters of the machine 102 and/or mobile device 104. The electrical signals are then converted to sensor data by a processor of the mobile device 104. Such sensor data may be unique to the type of machine 102. The sensor data may be associated with machine parameters of the machine. Machine parameters may include a machine type, an engine of the machine, etc. By way of example only, the sensor data can include at least one of an acceleration, an angular velocity, a latitude, a longitude, an altitude, and a horizontal accuracy of the mobile device 104, and a magnetic field strength around the mobile device 104. In other aspects, the sensor data can include temperature and pressure readings of or around the machine 102 and/or mobile device 104.

Figure 2:
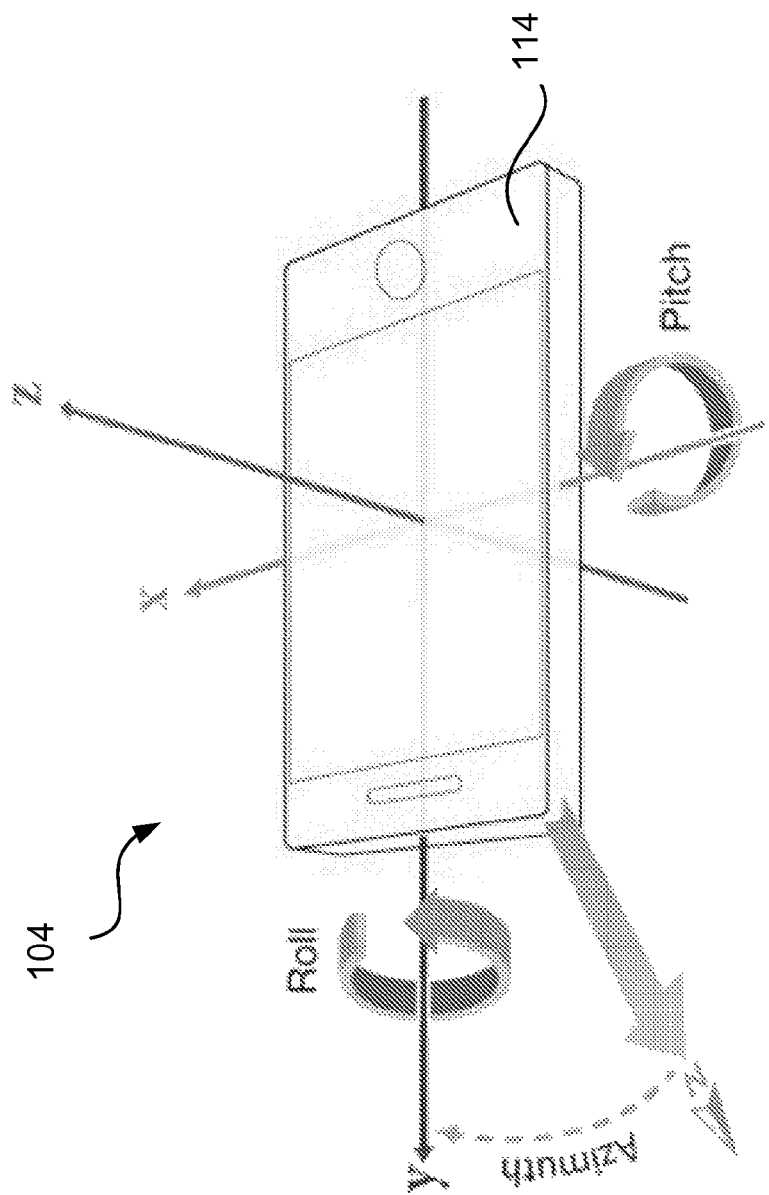
FIG. 2 illustrates a mobile device according to an aspect of the disclosure.

As further illustrated in FIG. 2, the sensor data can further include an azimuth, a roll, or a pitch of the mobile device 104. The coordinate system illustrated in FIG. 2 shows the x-y plane defined by the surface of the mobile device 104 with the y-axis oriented along the length and the x-axis oriented along the width of the mobile device 104. The z-axis may be defined to be normal to the x-y plane. Based on this coordination system, the azimuth is an angle between a reference direction, such as cardinal north, and the y-axis. Pitch can refer to an amount of angular rotation around the x-axis. Roll can refer to an amount of angular rotation around the y-axis. One of ordinary skill in the art would understand that the specific coordinate system is only exemplary and other orientations for the various axes can be utilized. The terms azimuth, roll, and pitch as used herein should be interpreted broadly and be understood to not be limited to the specific aspect disclosed in FIG. 2.

FIG. 1 also illustrates exemplary hardware configurations for the external computing platform 106. The external computing platform 106 may be a system, such as a fleet management system, configured to obtain and/or track information related to the operation of at least one machine 102. The external computing platform 106 may include microprocessors 116 of varying core configurations and clock frequencies. These entities may also include one or more memory devices 118 or computer-readable media of varying physical dimensions and storage capacities, such as flash drives, hard drives, random access memory, etc., for storing data, such as images, files, and program instructions for execution by one or more microprocessors 116. The external computing platform 106 may include one or more network interfaces 120, such as Ethernet adapters, wireless transceivers, or serial network components for communicating over wired or wireless media using protocols, such as Ethernet, wireless Ethernet, code divisional multiple access (CDMA), time division multiple access (TDMA), etc. These communication protocols may be used to communicate between the mobile device 104 and the external computing platform 106. The external computing platform 106 may also have one or more peripheral interfaces 122, such as keyboards, mice, touchpads, computer screens, touchscreens, etc. for enabling human interaction with and manipulation of devices of the external computing platform 106.

The external computing platform 106 may also have the computer-readable media physically or logically arranged or configured to provide for or store one or more data stores 124, such as one or more file systems or databases, and one or more software programs 126, which may contain interpretable or executable instructions for performing one or more of the disclosed aspects. The components may also comprise any type of hardware, including any necessary firmware or software for performing the disclosed aspects. The components may also be implemented in part or in whole by electronic circuit components or processors, such as application-specific integrated circuits (ASIC) or field-programmable gate arrays (FPGAs).

The mobile device 104 may be in wireless communication with the external computing platform 106. The mobile device 104 may include transceivers, filters, and signal amplifiers in order to communicate with the external computing platform 106 through the one or more network interfaces 120. The mobile device 104 may include hardware to handle and process Wi-Fi, Bluetooth, 3G, 4G, satellite, and/or any other wireless signals known in the art between the mobile device 104 and the external computing platform 106.

INDUSTRIAL APPLICABILITY

Conventional fleet management systems rely on software and/or hardware of a machine 102 in order to track the machine 102 using an external computing platform 106. As mentioned previously, legacy machines and/or machines from third party vendors may not have the requisite software and/or hardware to communicate with the external computing platform 106. A fleet operator may not be able to track all of the machines 102 in their fleet.

Therefore, as described in this disclosure, what is needed are methods and systems whereby a plurality of machines 102 may be tracked without relying on hardware and/or software of the plurality of machines 102. Modern mobile devices 104 are equipped with a plurality of mobile sensors 114, such as an accelerometer, a gyroscopic sensor, a magnetic field sensor, etc. A mobile device 104 having at least one mobile sensor 114 may be used to collect machine operation data associated with a machine 102 and transmit this sensor data to the external computing platform 106. Instead of relying on information gathered by the machine 102, a fleet management system may use sensor data collected from the mobile sensor 114 to estimate the location and behavior of the machine 102 in which the mobile device 104 is located. Each machine 102 in the fleet may similarly include a mobile device 104 on or within the machine 102 to allow a fleet management system or external computing platform to individually track the location and behavior of each machine 102. This enables the external computing platform 106 to manage machines otherwise incompatible with the external computing platform 106, such as legacy machines and third party machines 102. Such a system may create new opportunities for data mining and analytics.

Figure 3:
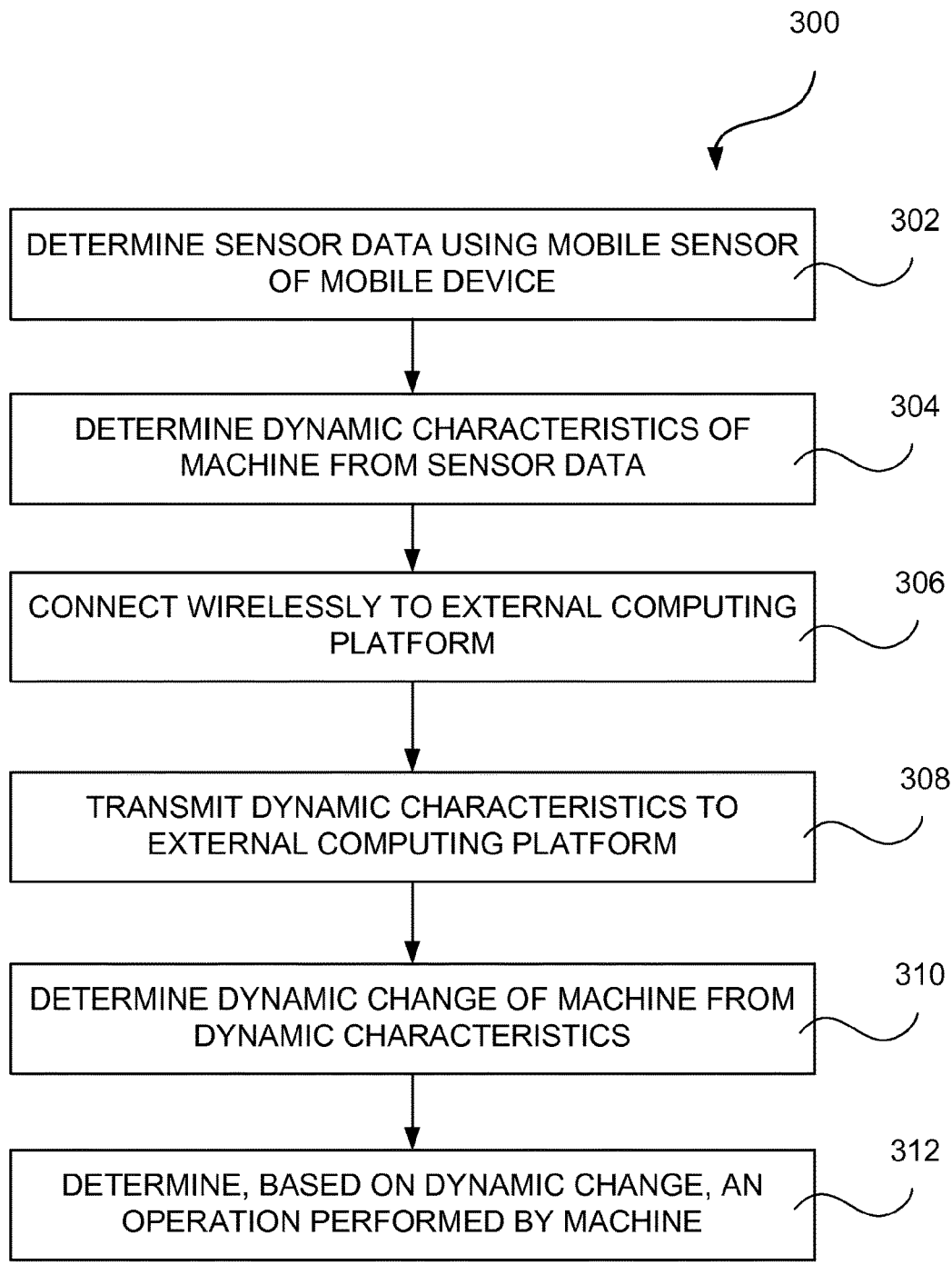
FIG. 3 illustrates a process for collecting machine operation data according to an aspect of the disclosure.

FIG. 3 illustrates a process 300 for collecting machine operation data using a mobile device 104. The process 300 may begin at step 302. At step 302, a mobile sensor 114 may determine a plurality of sensor data. The sensor data may be stored on a memory of the mobile device 104. For example, the mobile sensor 114 may determine first sensor data from a first point in time and/or second sensor data from a second point in time. The mobile sensor 114 may be constantly determining sensor data during, before, and/or after the operation of the machine 102. As mentioned before, the sensor data can include an acceleration, an angular velocity, an azimuth, a roll, a pitch, a latitude, a longitude, an altitude, and a horizontal accuracy of the mobile device 104, and a magnetic field strength around the mobile device 104. Because the mobile device 104 is preferably located within or on the machine 102, the sensor data may be used to estimate the location and behavior of the machine 102. For example, if the mobile sensor 114 includes a magnetic field sensor, the sensor data can include magnetic field strength information that can be used to determine a cardinal direction of the mobile device 104 and/or machine 102.

At step 304, the mobile device 104 may determine at least one dynamic characteristic of the machine 102 based on sensor data from the mobile sensor 114. The dynamic characteristic may be stored on a memory of the mobile device 104. Dynamic characteristics refer to characteristics that may change over time during operation of the machine 102, such as the location, speed, direction, etc. of the machine 102. This can be contrasted with static characteristics of the machine 102, such as the machine type, engine type, component type, machine dimensions, etc. For example, if the dynamic characteristic is a direction of the machine 102, the first sensor data may be a first location of the machine at the first point in time and the second sensor data may be a second location of the machine at the second point in time. Based on the change between the first location and the second location, the mobile device 104 may determine the direction of the machine 102. In another illustrative example, if the dynamic characteristic is a ground speed of the machine 102, the first sensor data may also be the first location of the machine at the first point in time and the second sensor data be the second location of the machine at the second point in time. The mobile device 104 may determine the ground speed of the machine 102 based on the difference between the first location and the second location and the difference between the first point in time and the second point in time.

At step 306, the mobile device 104 may connect wirelessly to the external computing platform 106. As described above, the mobile device 104 may connect via any wireless connection protocols known in the art, such as Wi-Fi, Bluetooth, 3G, 4G, etc. Then, at step 308, the mobile device 104 may transmit at least one dynamic characteristic to the external computing platform 106. The mobile device 104 may also transmit the plurality of sensor data to the external computing platform 106. The dynamic characteristics may be stored on a data store 124 of the external computing platform 106. The dynamic characteristics may be utilized for tracking of the machine 102 and further analytics related to the machine 102. For example, the dynamic characteristics may be compiled into a machine profile and used to develop a predictive model for more advanced machine application recognition.

At step 310, the process 300 may determine a dynamic change of the machine 102 from at least two dynamic characteristics of the machine 102. For example, the dynamic change may be a change in direction or ground speed of the machine 102. In other aspects, the dynamic change may be a change in vibrational frequencies of the mobile device 104. The dynamic change may also be a machine parameter profile over time. For example, the dynamic change may be profile of the direction or ground speed of the machine 102 over time. In other aspects, the dynamic change may be a profile of vibrational frequencies of the machine 102 over time. Step 310 may be performed at the mobile device 104 and/or external computing platform 106.

At step 312, the process 300 may determine an operation of the machine 102 based on the dynamic change determined in step 310. Step 312 may be performed at the mobile device 104 and/or external computing platform 106. An operation of the machine 102 may be an indication of whether the machine 102 is idle or in motion. The operation of the machine 102 may also be a path traversed by the machine 102 and/or a task performed by the machine 102. For example, based on a dynamic change of the machine 102, such as a path traversed by the machine 102 that includes rotation and reversing of the machine 102, in addition to particular vibrational frequency profiles of the machine 102, the mobile device 104 and/or external computing platform 106 may determine a haul truck has unloaded its cargo.

In some aspects of the disclosure, the mobile device 104 and/or external computing platform 106 may receive a machine type of the machine 102. For example, the mobile device 104 and/or external computing platform 106 may receive indication the machine 102 is a tractor, a dozer, a scraper, or another machine 102 known in the art. The machine type received by the mobile device 104 and/or external computing platform 106 via an operator input. The machine type may also be received by scanning a barcode, serial number, or other identifier on the machine 102 using the mobile device 104 or another input device. This information may be wirelessly transmitted between the mobile device 104 and external computing platform 106. The machine type may be used to determine the operation of the machine 102 in addition to the dynamic change information determined in step 310. For example, a vibrational frequency profile may correspond to a first operation when the machine 102 is a tractor, while the same vibrational frequency profile would correspond to a different operation when the machine 102 is a haul truck.

In further aspects of the disclosure, the mobile device 104 and/or external computing platform 106 may determine instructions to change an operation of the machine. The instructions may be instructions to change a first operation of the machine to a second operation of the machine. If the instructions are determined at the external computing platform 106, the instructions may be transmitted wirelessly to the mobile device 104. Once the instructions are at the mobile device 104, the mobile device 104 may relay the instructions to an operator of the machine 102, such as on a display of the mobile device 104, or to the machine directly. The operator and/or machine 102 may execute the instructions to change an operation of the machine 102.

In a non-limiting example, the dynamic change determined by the mobile device 104 and/or external computing platform 106 may be a vibrational frequency profile of the machine 102 and/or mobile device 104. The vibrational frequency profile may indicate indicate a pothole or other obstruction along a path traversed by the machine 102 based on abnormalities in the profile. The instructions to the machine 102 may include instructions to avoid the particular location of the pothole or obstruction. In another non-limiting example, the dynamic change determined by the mobile device 104 and/or external computing platform 106 may be path traversed by the machine 102. The instructions to the machine 102 may include instructions to adjust the path of the machine 102 to a more optimal path or to avoid an upcoming obstruction along the path.

It will be appreciated that the present disclosure may include any one and up to all of the following examples.

EXAMPLE 1

A method for collecting machine operation data of a machine. The method may include determining, by a mobile sensor of a mobile device processor located on or within a machine, a first sensor data and a second sensor data. The method may also include determining, based on at least one of the first sensor data and the second sensor data, a first dynamic characteristic of the machine. The method may also include connecting wirelessly the mobile device to an external computing platform. The method may also include transmitting the first dynamic characteristic from the mobile device to the external computing platform. The method may also include determining, by the mobile sensor of the mobile device processor located on or within the machine, a third sensor data and a fourth sensor data. The method may also include determining, based on at least one of the third sensor data and the fourth sensor data, a second dynamic characteristic of the machine. The method may also include transmitting the second dynamic characteristic to the external computing platform from the mobile device to the external computing platform. The method may also include determining, based on the first dynamic characteristic and the second dynamic characteristic, a first dynamic change of the machine. Finally, the method may also include determining, based on the first dynamic change, a first operation performed by the machine.

EXAMPLE 2

A method for connecting wirelessly a mobile device to an external computing platform wherein the mobile device is located on or within the machine. The method may include receiving a first dynamic characteristic of the machine from the mobile device. The first dynamic characteristic may be determined based on at least one of a first sensor data and a second sensor data from a mobile sensor of the mobile device. The method may include receiving a second dynamic characteristic of the machine from the mobile device. The second dynamic characteristic may be determined based on at least one of a third sensor data and a fourth sensor data from the mobile sensor of the mobile device. The method may include determining, based on the first dynamic characteristic and the second dynamic characteristic, a first dynamic change of the machine. Finally, the method may also include determining, based on the first dynamic change, a first operation performed by the machine.

EXAMPLE 3

The method of any one of Examples 1 and 2, wherein the mobile sensor is at least one of an accelerometer, a gyroscopic sensor, a magnetometer, a Global Positioning System (GPS), an Assisted GPS (A-GPS), a Global Navigation Satellite System (GNSS), and a Wi-Fi based positioning system of the mobile device.

EXAMPLE 4

The method of any one of Examples 1-3, wherein the first sensor data and the second sensor data are each at least one of an acceleration, an angular velocity, an azimuth, a roll, a pitch, a latitude, a longitude, an altitude, and a horizontal accuracy of the mobile device, and a magnetic field strength around the mobile device.

EXAMPLE 5

The method of any one of Examples 1-4, wherein the first dynamic characteristic and the second dynamic characteristic are each at least one of a speed, an acceleration, and a direction of the mobile device.

EXAMPLE 6

The method of any one of Examples 1-5, further including transmitting machine data including the first operation from the mobile device to the external computing platform.

EXAMPLE 7

The method of any one of Examples 1-6, wherein determining, based on the first dynamic change, the first operation performed by the machine includes determining, at the mobile device based on the first dynamic change, the first operation performed by the machine.

EXAMPLE 8

The method of any one of Examples 1-7, wherein determining, based on the first dynamic change, the first operation performed by the machine includes determining, at the external computing platform and based on the first dynamic change, the first operation performed by the machine.

EXAMPLE 9

The method of any one of Examples 1-8, further includes storing the first dynamic characteristic and the second dynamic characteristic on a memory of the mobile device.

EXAMPLE 10

The method of any one of Examples 1-9, further includes receiving, at the mobile device, a machine type of the machine.

EXAMPLE 11

The method of Example 10, wherein determining, based on the first dynamic change, the first operation performed by the machine includes determining, based on the machine type of the machine and the first dynamic change, the first operation performed by the machine.

EXAMPLE 12

The method of Example 10, wherein receiving, at the mobile device, the machine type of the machine includes receiving an operator input at the mobile device, the operator input indicating the machine type of the machine.

EXAMPLE 13

The method of any one of Examples 1-12, further includes determining instructions to change the first operation of the machine to a second operation of the machine based on the first dynamic change.

EXAMPLE 14

The method of Example 13, wherein determining instructions to change the first operation of the machine to a second operation of the machine based on the first dynamic change includes determining, by the mobile device, instructions to change the first operation of the machine to a second operation of the machine, based on the first dynamic change.

EXAMPLE 15

The method of Example 13, wherein determining instructions to change the first operation of the machine to a second operation of the machine based on the first dynamic change includes determining, by the external computing platform, instructions to change the first operation of the machine to a second operation of the machine, based on the first dynamic change.

EXAMPLE 16

The method of Example 15, further includes receiving, at the mobile device, the instructions to change the first operation to the second operation of the machine based on the first dynamic change.

EXAMPLE 17

An article of manufacture comprising non-transitory machine-readable media having instructions encoded thereon for causing a processor to execute a method of any one of Examples 1-16.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Whether such functionality is implemented as hardware or software depends upon the design constraints imposed on the overall system. Skilled persons may implement the described functionality in varying ways for each particular application, but such implementation decisions should not be interpreted as causing a departure from the scope of the disclosure. In addition, the grouping of functions within a module, block, or step is for ease of description. Specific functions or steps may be moved from one module or block without departing from the disclosure.

The various illustrative logical blocks and modules described in connection with the aspects disclosed herein may be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor (e.g., of a computer), or in a combination of the two. A software module may reside, for example, in Random Access Memory (RAM), flash memory, Read-Only Memory (ROM), Erasable Programmable Read-Only Memory (EPROM), Electrically Erasable Programmable Read-Only Memory (EEPROM), registers, hard disk, a removable disk, a CD-ROM, or any other form of storage medium. An exemplary storage medium may be coupled to the processor such that the processor may read information from, and write information to, the storage medium. In the alternative, the storage medium may be integral to the processor. The processor and the storage medium may reside in an ASIC.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed example aspects. The exemplary systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LIE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the processes set forth by the disclosure and as defined by the claims.

What is claimed is:

1. A method comprising:
   determining, by a mobile sensor included in a mobile device, first sensor data and second sensor data while the mobile device is located on or within a machine;
   determining, by the mobile device and based on at least one of the first sensor data or the second sensor data, a first dynamic characteristic of the machine;
   connecting wirelessly the mobile device to an external computing platform;
   transmitting, by the mobile device, information identifying the first dynamic characteristic to the external computing platform;
   determining, by the mobile sensor included in the mobile device, third sensor data and fourth sensor data while the mobile device is located on or within the machine;
   determining, by the mobile device and based on at least one of the third sensor data or the fourth sensor data, a second dynamic characteristic of the machine;
   transmitting, by the mobile device, information identifying the second dynamic characteristic to the external computing platform;
   determining, based on the first dynamic characteristic and the second dynamic characteristic, a dynamic change of the machine,
      the dynamic change being a profile of vibrational frequencies of the machine over time; and
   determining, based on the profile of vibrational frequencies, an operation performed by the machine.

2. The method of claim 1, wherein the mobile sensor is at least one of an accelerometer, a gyroscopic sensor, a magnetometer, a Global Positioning System (GPS), an Assisted GPS (A-GPS), a Global Navigation Satellite System (GNSS), or a WiFi based positioning system of the mobile device.

3. The method of claim 1, wherein the first sensor data includes data regarding at least one of an acceleration, an angular velocity, an azimuth, a roll, a pitch, a latitude, a longitude, an altitude, a horizontal accuracy of the mobile device, or a magnetic field strength around the mobile device.

4. The method of claim 1, wherein the first dynamic characteristic is at least one of a speed, an acceleration, or a direction of the mobile device.

5. The method of claim 1, further comprising:
   transmitting machine data, regarding the operation performed by the machine, from the mobile device to the external computing platform.

6. The method of claim 1, wherein determining the operation performed by the machine comprises:
   determining, by the mobile device and based on the profile of vibrational frequencies, the operation performed by the machine.

7. The method of claim 1, wherein determining, the operation performed by the machine comprises:
   determining, by the external computing platform and based on the profile of vibrational frequencies, the operation performed by the machine.

8. The method of claim 1, further comprising:
   storing the first dynamic characteristic and the second dynamic characteristic in a memory of the mobile device.

9. The method of claim 1, further comprising:
   receiving, by the mobile device, information regarding a machine type of the machine.

10. The method of claim 9, wherein determining the operation performed by the machine comprises:
   determining, based on the machine type of the machine and the profile of vibrational frequencies, the operation performed by the machine.

11. The method of claim 9, wherein receiving the information regarding the machine type of the machine comprises:
   receiving an operator input at the mobile device,
      the operator input indicating the information regarding the machine type of the machine.

12. The method of claim 1, further comprising:
   providing, by the mobile device, instructions to change the operation performed by the machine to a different operation of the machine based on the profile of vibrational frequencies.

13. The method of claim 1, further comprising:
   scanning an identifier on the machine to determine a type of the machine,
      wherein determining the operation performed by the machine comprises:
         determining the operation performed by the machine based on the profile of vibrational frequencies and the type of the machine.

14. The method of claim 1, further comprising:
   identifying instructions to avoid a pothole or an obstruction indicated by the profile of vibrational frequencies; and
   providing, for display or to the machine, the instructions.

15. A method comprising:
   connecting, by a computing system, to a mobile device located on or within a machine;
   receiving, by the computing system and from the mobile device, information identifying a first dynamic characteristic of the machine,
      the first dynamic characteristic being determined based on at least one of first sensor data or second sensor data from a mobile sensor of the mobile device;
   receiving, by the computing system and from the mobile device, information identifying a second dynamic characteristic of the machine,
      the second dynamic characteristic being determined based on at least one of third sensor data or fourth sensor data from the mobile sensor of the mobile device;
   determining, by the computing system and based on the first dynamic characteristic and the second dynamic characteristic, a dynamic change of the machine,
      the dynamic change being a profile of vibrational frequencies of the machine over time; and
   determining, by the computing system and based on the profile of vibrational frequencies, an operation performed by the machine.

16. The method of claim 15, wherein determining the operation performed by the machine comprises:
   determining, based on a machine type of the machine and the profile of vibrational frequencies, the operation performed by the machine.

17. A mobile device comprising:
   a mobile sensor; and
   one or more processors to:
      identify a first dynamic characteristic of a machine while the mobile device is located on or within the machine,
         the first dynamic characteristic being based on sensor data from a mobile sensor of the mobile device;
      identify a second dynamic characteristic of the machine while the mobile device is located on or within the machine;
      determine, based on the first dynamic characteristic and the second dynamic characteristic, a dynamic change of the machine,
         the dynamic change being a profile of vibrational frequencies of the machine over time; and
      determine, based on the profile of vibrational frequencies, an operation performed by the machine.

18. The mobile device of claim 17,
   wherein the one or more processors are further to:
      identify information regarding a machine type of the machine after the mobile device is used to scan an identifier on the machine, and
   wherein, when determining the operation performed by the machine, the one or more processors are to:
      determine the operation performed by the machine based on the profile of vibrational frequencies and the information regarding the machine type.

19. The mobile device of claim 17, wherein the one or more processors are further to:
   provide, based on the profile of vibrational frequencies, an instruction for the machine to avoid a location of a pothole.

20. The mobile device of claim 17, wherein the operation performed by the machine comprises one or more of:
   a path traversed by the machine, or
   a task performed by the machine.

* * * * *